Aug. 13, 1968 D. L. OTTO 3,396,975
BEARING SEAL CASE CONSTRUCTION
Filed March 18, 1966 2 Sheets-Sheet 1

INVENTOR:
DENNIS L. OTTO
BY
Gravely, Lieder & Woodruff
ATTORNEYS.

Aug. 13, 1968    D. L. OTTO    3,396,975

BEARING SEAL CASE CONSTRUCTION

Filed March 18, 1966    2 Sheets-Sheet 2

INVENTOR:
DENNIS L. OTTO
BY
Gravely, Lieder & Woodruff
ATTORNEYS

United States Patent Office 3,396,975
Patented Aug. 13, 1968

3,396,975
BEARING SEAL CASE CONSTRUCTION
Dennis Lee Otto, Canton, Ohio, assignor to The Timken Roller Bearing Company, Canton, Ohio, a corporation of Ohio
Filed Mar. 18, 1966, Ser. No. 535,521
5 Claims. (Cl. 277—26)

This invention relates to bearing seal cases and is particularly directed to improvements in the seal case and locking means in anti-friction bearings for railway car trucks.

The present seal case is especially applicable to cartridge-type tapered roller bearing assemblies mounted in a railway car truck to support the axle journal. In such an assembly the bearing cup is a cylindrical member having inner raceways for the tapered rollers within the opposite ends, and the cup is formed with an overhanging lip at each end and an annular recess inwardly of the outer end of the lip.

Heretofore, the bearing seal cases have been formed of sheet metal in a stamping operation. It has been a problem to hold the seal case stamping to the required tolerance for a secure fit in the cup lip recess. A series of seal cases made in the same stamping die show marked differences in dimensions which become significant with wear in the die. Also, the seal cases exhibit high stress concentrations due to shape differences, and it is difficult to obtain a secure fluid-tight fit in all cases.

The present invention overcomes these difficulties by providing a molded seal case formed in a closely toleranced mold, whereby successive seal cases are substantially dimensionally the same. The seal cases are formed with a cylindrical extension which fits into the overhanging bearing cup lip to retain the seal case, or locking means is formed on the extension to snap-fit into a suitable lip recess. The use of plastic material for seal cases is generally limited to bearing applications where very small temperature ranges are present. To overcome this limitation, the present invention provides reinforcing means and locking means having the same thermal coefficient of expansion as the bearing cup material. This allows for large changes in temperature which is the rule with railway axle bearings, because the reinforcing or locking means will expand or contract the seal case extension at the same rate as the bearing cup.

It is, therefore, an important object of this invention to provide a new and useful plastic seal case and reinforcing or locking means for railway axle bearings.

It is also an important object of this invention to provide a moldable bearing seal case with locking means which will cause the seal case to maintain a fluid tight fit in a bearing cup over large changes in temperature.

Another object of the present invention is to provide a novel seal case of plastic material having a plastic surface presented to the bearing cup so that a static seal is effected by cold flow of the plastic, thereby allowing the asperities of the bearing cup lip to imbed into the plastic.

A further object of this invention is to provide reinforcing means in a plastic seal case so that there is an increased radial force between the seal case and bearing cup to provide improved seal case retention and greater reliability.

Other objects of the present invention reside in the parts and components hereinafter set forth in the following specification of certain preferred embodiments illustrated in the accompanying drawings, wherein.

Figure 1:
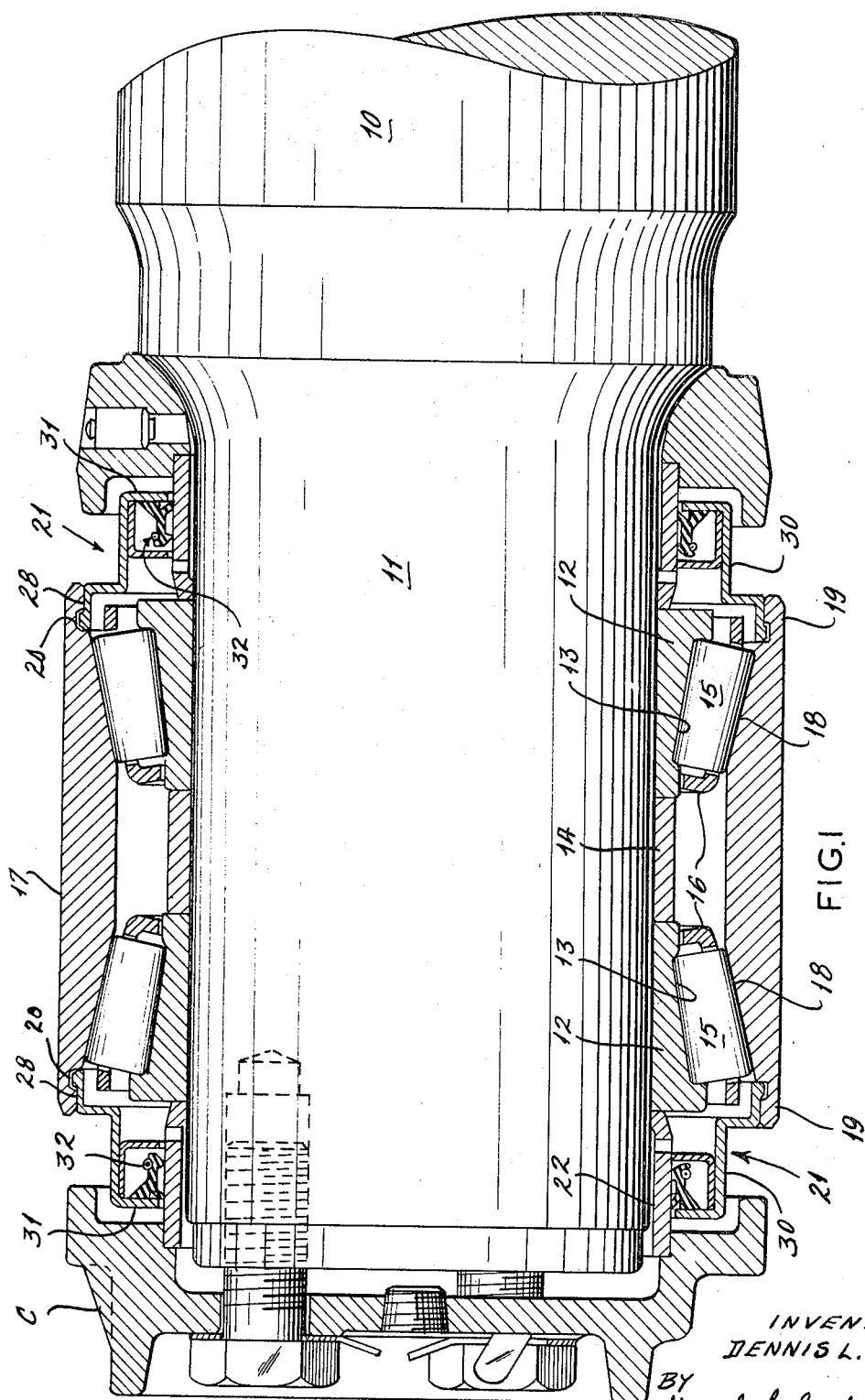
FIG. 1 is a longitudinal sectional view through a railway truck journal having an anti-friction bearing assembly equipped with the improved seal case and locking means.

In FIG. 1 the cartridge type anti-friction tapered roller bearing assembly is mounted on the journal of a railway car truck axle. Thus the axle 10 has journal 11 which receives the cones 12 having tapered raceways 13. The cones 12 are spaced by the ring 14. Tapered rollers 15 with cages 16 are mounted on the raceways 13, and the rollers are enclosed by a cup 17 having tapered raceways 18 to engage the rollers 15. The cup 17 is formed with axially extending lips 19 at its opposite ends, and each lip 19 has an internal annular recess 20. Bearing seal assemblies 21 are positioned at each end of the cup 17. The bearing cup 17 is engaged by a suitable bearing adapter (not shown) which connects the bearing assembly to the side frame member of the truck (not shown). An end cap C is secured to the journal 11 to retain the bearing assembly through the spacer ring 22.

Still referring to FIG. 1, it can be seen that the bearing seal assemblies 21 are substantially alike. Each such assembly 21 comprises a seal case 27 having an enlarged diameter extension 28 fitted into the cup lip 19, a radially inwardly directed wall 29, an axially directed smaller diameter portion 30 and an outer radially directed wall 31. The seal 32 is mounted in the case between the portion 30 and outer wall 31.

Figure 2:
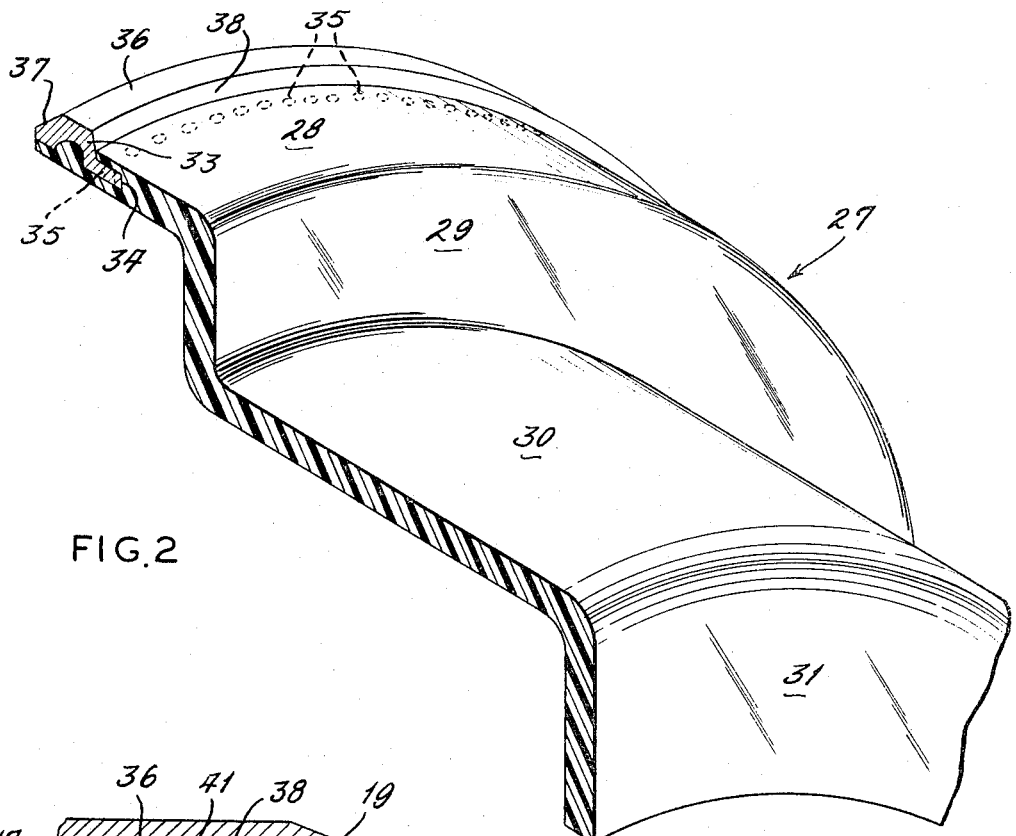
FIG. 2 is a fragmentary perspective view of the seal case and locking means shown in FIG. 1.
Figure 3:
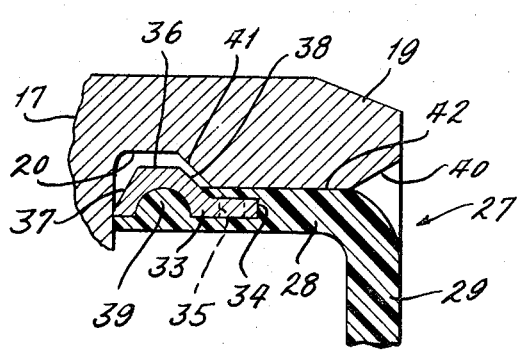
FIG. 3 is a fragmentary sectional view of the seal case and bearing cup of FIG. 1 on an enlarged scale.

In FIGS. 2 and 3, the seal case 27 is a plastic member shaped by molding or hot forming to the configuration shown. The plastic member is reinforced with fiberglass, wire mesh, or the like. When forming case 27 the portion 28 is provided with a metallic ring 33 having an inner flange 34 in which a series of holes 35 is formed so that the plastic material will fill the holes for retention of the ring 33. The outer end of the ring 33 is formed with an annular bead 36 having a bevelled lead surface 37 and a bevelled locking surface 38. The bead 36 is concave on its under side so that a bead 39 of the plastic material will fill the concavity and more securely retain the ring 33.

In mounting the seal case 27 in the cup lip 19 the lead bevel 37 on ring 33 engages the bevel surface 40 on the cup lip 19. The bevelled surfaces 37 and 40 cooperate to constrict the case ring 33 sufficiently to allow the bead 36 to slide into the recess 20 and expand so that the rear bevelled surface 38 will retain the case by engaging the recess bevelled surface 41. Once the bead 36 has reached recess 20, the portion 28 of the seal case 27 will present its outer cylindrical surface to the asperities of the inner surface 42 of the cup lip 19, thereby forming a static seal by the cold flow of the plastic material. After assembly, the metallic ring 33 secures the case portion 28 in position and will expand and contact with the cup lip 19 since these metallic parts will have substantially the same coefficient of thermal expansion.

Figure 4:
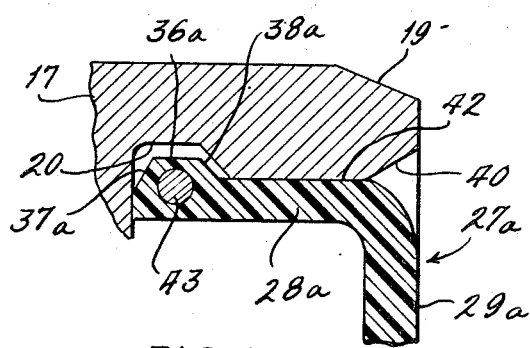
FIG. 4 is a fragmentary sectional view of a bearing cup and a modified seal case.

A modified seal case 27a is shown in FIG. 4 and comprises a molded bead 36a on the cylindrical portion 28a. The bead 36a has a lead bevel surface 37a and rear bevel surface 38a, and there is embedded in the bead a metallic wire 43 which provides reinforcement for the bead 36a. The metallic wires 43 will act to expand and contract the bead 36a as it has substantially the same coefficient of thermal expansion as the cup lip 19. The assembly of the modified case 27a to cup lip 19 is effected in the same way as for case 27. When assembled, the outer plastic surfaces of the case 27a will provide a static seal by the cold flow of the plastic by allowing the asperities of the inner surface 42 of cup lip 19 to embed.

Figure 5:
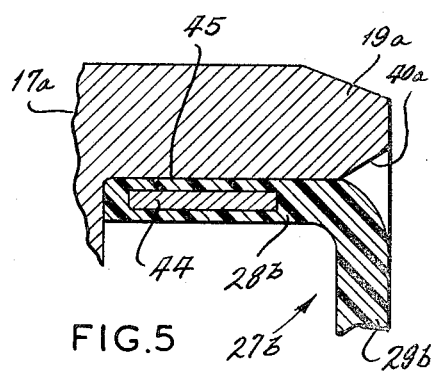
FIG. 5 is similar to FIG. 4, but illustrating a further modification of the seal case.

The modified seal case 27b of FIG. 5 is particularly useful with cups 17a where the lips 19a do not have an annular recess, such as the recess 20 of FIG. 3 or 4. In this form the seal case portion 28b is straight and has an embedded metallic ring 44 which is sufficiently compressed upon insertion into lip 19a to effect cold flow of the plastic material 45 and allow the asperities of the lip surface 42a to embed therein. Thus, a static seal is effected, and retention of the case portion 28b is mainly obtained by the hoop stress imposed in the ring 44.

The foregoing description has set forth preferred embodiments of the invention in which the seal cases are formed of any thermoplastic materials that can be reinforced with wire mesh, fibre glass, woven fabrics, or the like to impart strength, and in which the mounting bead is treated with metallic members to make it thermally compatible with the bearing cup lip for railway car usage. The features of this invention are set forth in the appended claims and include an appropriate range of equivalents.

What is claimed is:

1. In an axle journal anti-friction bearing assembly having a bearing cup with an axially extending lip formed with an inner annular surface spaced from the axle journal and an annular recess in said annular surface; the improvement which comprises a seal device between the inner annular surface of the bearing cup lip and the axle journal, said seal device including a seal assembly, a seal case of moldable plastic material secured to said seal assembly, said seal case locating said seal assembly in engagement with the axle journal and having an annular bead on an axially extending portion engaged with the inner annular surface of the bearing cup lip and said annular bead being seated in the annular recess for retention of said seal case, said axially extending portion of said seal case presenting its plastic material to the asperities of the inner annular surface of the bearing cup lip to effect embedment thereof by cold flow, and a reinforcing member carried by said axially extending portion and received within the axial dimension of the inner annular surface of the bearing cup lip, said reinforcing member being carried in said annular bead and having a coefficient of thermal expansion and contraction substantially the same as the bearing cup lip.

2. The subject matter set forth in claim 1 wherein said reinforcing member is a metallic wire molded into said axially extending portion of said seal case.

3. The subject matter set forth in claim 1 wherein said annular bead has bevelled lead and locking surfaces, the locking surface engaging the annular recess to retain said seal case in position.

4. The subject matter set forth in claim 1 wherein said annular bead is a metallic part having bevelled lead and locking surfaces, said locking surface engaging in the annular recess to retain said seal case in position, and said reinforcing member is metallic and is integral with said metallic part.

5. The subject matter set forth in claim 1 wherein said seal case is reinforced with fiberglass throughout the plastic material.

References Cited

UNITED STATES PATENTS

| 2,834,616 | 5/1958 | Gebert et al. | 277—37 |
| 2,879,114 | 3/1959 | Bowen | 277—183 X |
| 2,893,770 | 7/1959 | Poncet | 277—183 X |
| 2,937,039 | 5/1960 | Santapa | 277—26 |
| 3,341,264 | 9/1967 | Otto | 277—37 X |
| 3,341,265 | 9/1967 | Paterson | 277—37 X |

FOREIGN PATENTS 695,408  8/1953  Great Britain.

LAVERNE D. GEIGER, *Primary Examiner.*

J. S. MEDNICK, *Assistant Examiner.*